United States Patent Office 3,558,592
Patented Jan. 26, 1971

3,558,592
PHENYL-AZO-NAPHTHOL DYES
Rene de Montmollin, Riehen, Switzerland, assignor to Ciba Limited, Basel, Switzerland, a company of Switzerland
No Drawing. Filed Dec. 12, 1967, Ser. No. 689,775
Claims priority, application Switzerland, Dec. 15, 1966, 17,918/66, 17,919/66
Int. Cl. C07c 107/08; C09b 29/30
U.S. Cl. 260—199         12 Claims

ABSTRACT OF THE DISCLOSURE

The invention relates to monoazo dyestuffs which, in the form of the free acid, correspond to the formula

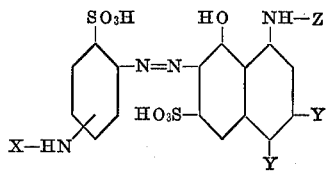

in which one of the symbols Y represents a hydrogen atom and the other symbol Y represents a sulphonic acid group, Z represents an acyl grouping and X represents an α-bromacrylic grouping, an α,β-dibromopropionyl grouping, a mono- or dinitrochlorobenzoyl or a mono- or dinitrobenzenesulphonyl grouping.

---

The present invention provides valuable monoazo dyestuffs of the general formula

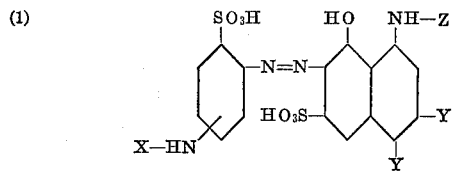

in which one of the symbols Y represents a hydrogen atom and the other symbol Y represents a sulphonic acid group, X represents a mono- or dinitrochlorobenzoyl group or preferably an α-bromacrylic group (that is to say, a

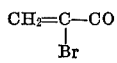

group) or an α,β-dibromopropionyl group and Z represents an acyl grouping. The acyl substituent Z may be derived from a sulphonic acid or preferably from a carboxylic acid. It is advantageously an α-bromacrylic residue, an α,β-dibromopropionyl residue or an β-bromacrylic-aminobenzoyl or α,β-dibromopropionylaminobenzoyl residue.

The dyestuff may be further described in the form of its free acid by the following formula

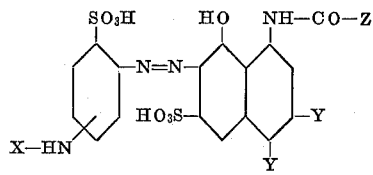

in which one of the symbols Y represents a hydrogen atom and the other symbol Y represents a sulphonic acid group, Z represents alkyl or alkenyl containing up to 4 carbon atoms, phenyl, alkylcarboxamidophenyl, alkenylcarboxamidophenyl containing up to 4 carbon atoms in said alkyl and alkenyl chain, and phenylcarboxamidophenyl; and X represents an α-bromoacrylic grouping, an α,β-dibromopropionyl grouping, a mono- or di-nitrochlorobenzoyl grouping.

The dyestuffs may be manufactured by acylation, by coupling or, when the substituent represented by X is an α-bromacrylic group, by elimination of hydrogen bromide. For example, diazo compounds derived from aromatic amines of the formula (2)
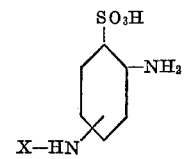

may be coupled with coupling components of the formula (3)
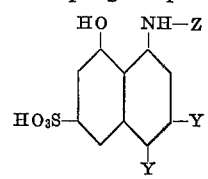

or of the formula

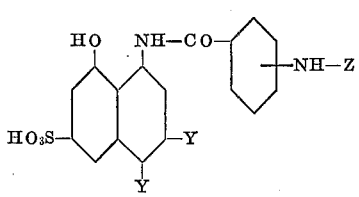

in which formulae the various symbols have the meanings ascribed to them in Formula 1. This also applies to all formulae hereinafter shown.

The coupling components of the Formula 3 used as starting materials in the process may be prepared by known methods, for example, by monoacylation of 1-amino-8-hydroxynaphthalene-3,6- or -4,6-disulphonic acid with anhydrides or halides of sulphonic or carboxylic acids, for example, acetic, propionic, butyric or benzoic acid, and also with acid halides containing fibre-reactive acyl residues. Those in which the symbol Z represents an α-bromacrylic grouping may also be prepared from α,β-dibromopropionylamino-8-hydroxynaphthalene-3,6- or -4,6-disulphonic acid by elimination of hydrogen bromide.

The following are given as examples of coupling components of the Formula 3:

1-acetylamino-8-hydroxynaphthalene-3,6- or -4,6-disulphonic acid,
1-propionylamino-8-hydroxynaphthalene-3,6- or -4,6-disulphonic acid,
1-butyrylamino-8-hydroxynaphthalene-3,6- or -4,6-disulphonic acid,
1-benzoylamino-8-hydroxynaphthalene-3,6- or -4,6-disulphonic acid,
1-chloroacetylamino-8-hydroxynaphthalene-3,6- or -4,6-disulphonic acid,
1-acrylamino-8-hydroxynaphthalene-3,6- or -4,6-disulphonic acid,
1-(α,β-dichloro- or -dibromopropionylamino)-8-hydroxynaphthalene-3,6- or -4,6-disulphonic acid,
1-(α-bromoacrylamino)-8-hydroxynaphthalene-3,6- or -4,6-disulphonic acid,
1-chlorobenzoylamino-8-hydroxynaphthalene-3,6- or -4,6-disulphonic acid,
and also 1-(α,β-dibromopropionylaminobenzoylamino)-8-hydroxynaphthalene-3,6- or -4,6-disulphonic acid.

The following are given as examples of diazo components that are to be coupled with the aforementioned coupling components:

4- or 5-mono- or dinitrochlorobenzoylamino-2-aminobenzene-1-sulphonic acid, but preferably 4- or 5-($\alpha,\beta$-dibromopropionylamino)-2-aminobenzene-1-sulphonic acid and 4- or 5-$\alpha$ - bromacrylamino-2-aminobenzene-1-sulphonic acid. These amines may be coupled with the above-mentioned coupling components of the Formula 3 in the customary manner, for example, in that they are diazotized with sodium nitrite and a mineral acid and the diazo components in a neutral to alkaline aqueous medium, for example, an aqueous medium made alkaline with sodium carbonate.

The dyestuffs of the Formula 1 may also be manufactured by acylating dyestuffs of the formula (4) 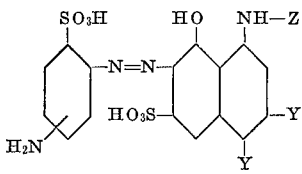

which are obtained by known methods, with halides of mono- or dinitrochlorobenzoic acid or $\alpha$-bromacrylic acid, for example, in an aqueous medium in the presence of an agent capable of binding acid. The dyestuffs of the Formula 1 in which X and Z each represents an identical acylamino group may also be manufactured by diacylating dyestuffs of the formula (5) 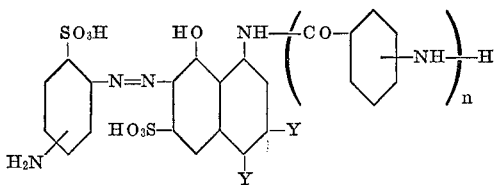

which may be obtained by known methods, for example, in an aquaous medium, in the presence of an agent capable of binding acid. Furthermore, the $\alpha$-bromacrylic derivative of the Formula 1 may also be obtained by the elimination of hydrogen bromide from the corresponding $\alpha,\beta$-dibromopropionyl compounds. Elimination of the hydrogen bromide is effected by a known method, for example, by a treatment with an alkali.

The dyestuffs of the Formula 1 obtained by the process of the invention and the modifications thereof are new. They are suitable for dyeing and printing a very wide variety of materials, for example, materials of animal origin, for example, leather, silk and especially wool, and also various man-made fibres, for example, polyamide and polyurethane fibres. They are specially suitable for application in a neutral to acid medium. The dyeings so obtained on wool exhibit excellent fastness to light, milling, perspiration and washing.

The new dyestuffs are also suitable for dyeing and printing cellulosic materials, for example, cotton and regenerated cellulose fibres, fixation being effected by a heat treatment in the presence of an alkali, for example, in the presence of sodium carbonate, sodium hydroxide or trisodium phosphate. Compared with known dyestuffs most closely comparable with those of the present invention, the dyestuffs obtained by the process of the invention display a higher degree of solubility, better properties of wet fastness and, in particular, better behaviour in the presence of levelling agents, especially in the presence of polyglycol ether derivatives containing, on average, at least 10—$CH_2$—$CH_2$—O— groups and which are derived from primary monoamines containing an aliphatic hydrocarbon residue having at least 20 carbon atoms.

The following examples illustrate the invention. Unless otherwise stated, the parts and percentages are by weight.

EXAMPLE 1

40.2 parts of 4-($\alpha,\beta$-dibromopropionylamino)-1-aminobenzene-2-sulphonic acid are dissolved in 600 parts of water in the presence of sodium carbonate; 30 parts of 30% hydrochloric acid are added at 0 to 5° C. and diazotization is effected with 25 parts by volume of 4 N sodium nitrite solution. The diazo suspension, which is acid to Congo paper, is then added to a solution of 42.3 parts of 1-benzoylamino-8-hydroxynaphthalene - 3,6 - disulphonic acid and 40 parts of sodium acetate in 400 parts of water. After coupling, the pH of the dyestuff is adjusted to 12 by the addition of 10 N sodium hydroxide solution, the temperature being kept at between 10 and 15° C. by the addition of ice. After about 15 minutes, the batch is neutralized to pH 7 by the addition of hydrochloric acid, the dyestuff is precipitated by the addition of sodium chloride, isolated by filtation and then dried in vacuo at 70 to 80° C.

The dyestuff so obtained which, in the form of the free acid, corresponds to the formula

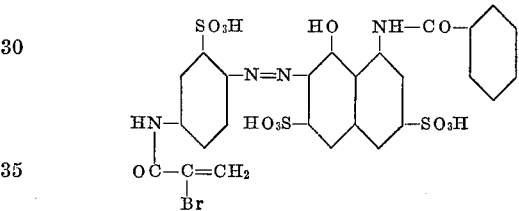

dyes wool fast, red-violet shades.

A dyestuff which dyes wool fast, bluish red shades may be obtained by replacing the 4-($\alpha,\alpha$-dibromopropionylamino)-1-aminobenzene-2-sulphonic acid with 5-($\alpha,\beta$-dibromopropionylamino)-1-aminobenzene-2-sulphonic acid.

EXAMPLE 2

32-1 parts of 4-($\alpha$-bromacrylamino)-1-aminobenzene-2-sulphonic acid are dissolved in 600 parts of water in the presence of sodium carbonate; 30 parts of 30% hydrochloric acid are added at 0 to 5° C. and diazotization is effected with 25 parts by volume of 4 N sodium nitrite solution. The diazo suspension, which is acid to Congo paper, is added to a solution of 42.3 parts of 1-benzoylamino-8-hydroxynaphthalene-3,6-disulphonic acid and 40 parts of sodium acetate in 400 parts of water. After coupling, the dyestuff is precipitated by the addition of sodium chloride, isolated by filtration and then dried in vacuo at 70 to 80° C. The dyestuff so obtained is identical with the dyestuff described in the first paragraph of example 1.

A dyestuff which is identical with the dyestuff described in the second paragraph of example 1 may be obtained by replacing the 4-($\alpha$-bromacrylamino)-1-aminobenzene-2-sulphonic acid with 5-($\alpha$-bromacrylamino)-1-aminobenzene-2-sulphonic acid.

Dyestuffs which dye wool the shades indicated in Column III of the following table may be obtained from the diazo components listed in Column I by coupling with the coupling components listed in Column II in accordance with the process described in Example 1.

The $\alpha,\beta$-dibromopropionyl derivatives shown in Columns I and II may be replaced by the corresponding $\alpha$-bromacrylic derivatives, in which case the procedure described in Example 2 should be followed.

| I | II | III |
|---|---|---|
| 4-(α,β-dibromopropionylamino)-1-aminobenzene-2-sulphonic acid | 1-acetylamino-8-hydroxynaphthalene-3,6-disulphonic acid | Red. |
| Do | 1-acetylamino-8-hydroxynaphthalene-4,6-disulphonic acid | Red. |
| 5-(α,β-dibromopropionylamino)-1-aminobenzene-2-sulphonic acid | do | Red. |
| Do | 1-propionylamino-8-hydroxynaphthalene-4,6-disulphonic acid | Red. |
| Do | 1-n-butyrylamino-8-hydroxynaphthalene-4,6-disulphonic acid | Red. |
| Do | 1-benzoylamino-8-hydroxynaphthalene-4,6-disulphonic acid | Red. |
| Do | 1-acetylamino-8-hydroxynaphthalene-3,6-disulphonic acid | Red. |
| Do | 1-chloroacetylamino-8-hydroxynaphthalene-3,6-disulphonic acid | Red. |
| Do | 1-chloroacetylamino-8-hydroxynaphthalene-4,6-disulphonic acid | Red. |
| Do | 1-acrylamino-8-hydroxynaphthalene-4,6-disulphonic acid | Red. |
| Do | 1-acrylamino-8-hydroxynaphthalene-3,6-disulphonic acid | Red. |
| Do | 1-(α,β-dibromopropionylamino-8-hydroxynaphthalene-3,6-disulphonic acid | Red. |
| Do | 1-(α,β-dibromopropionylamino-8-hydroxynaphthalene-4,6-disulphonic acid | Red. |
| 4-(α,β-dibromopropionylamino)]1-aminobenzene-2-sulphonic acid | 1-(α,β-dibromopropionylamino-8-hydroxynaphthalene-3,6-disulphonic acid | Red. |
| Do | 1-(α,β-dibromopropionylamino-8-hydroxynaphthalene-4,6-disulphonic acid | Red. |
| Do | 1-bromoacetylamino-8-hydroxynaphthalene-4,6-disulphonic acid | Red. |

EXAMPLE 3

41.6 parts of 5-(3′,5′-dinitro-4′-chlorobenzoylamino)-1-amino-benzene-2-sulphonic acid are dissolved in 500 parts of water in the presence of sodium carbonate; 30% hydrochloric acid is added at 0 to 5° C. and diazotization is effected with 25 parts by volume of 4 N sodium nitrite solution. The diazo suspension is added to a solution of 42.3 parts of 1-benzoylamino-8-hydroxynaphthalene-3,6-disulphonic acid in 400 parts of water and 40 parts of sodium acetate. After coupling, the dyestuff is completely precipitated by the addition of sodium chloride, isolated by filtration and then dried in vacuo at 80 to 90° C. The dyestuff so obtained dyes wool fast, bluish red shades.

Similar dyestuffs which also dye wool fast red shades may be obtained by replacing the 1-benzoylamino-8-hydroxypathalene-3,6-disulphonic acid with an equivalent proportion of one of the following coupling components:

1-acetylamino-8-hydroxynaphthalene-3,6-disulphonic acid,
1-acetylamino-8-hydroxynaphthalene - 4,6 - disulphonic acid,
1 - propionylamino - 8 - hydroxynaphthalene - 4,6 - disulphonic acid,
1 - n - butyrylamino - 8 - hydroxynaphthalene - 4,6 - disulphonic acid,
1 - benzoylamino - 8 - hydroxynaphthalene - 4,6 - disulphonic acid,
1 - chloroacetylamino - 8 - hydroxynaphthalene - 3,6 - disulphonic acid,
1 - methanesulphonylamino - 8 - hydroxynaphthalene -3, 6-disulphonic acid,
1 - chloroacetylamino - 8 - hydroxynaphthalene - 4,6 - disulphonic acid,
1 - acrylamino - 8 - hydroxynaphthalene-4,6 - disulphonic acid,
1 - acrylamino - 8 - hydroxynaphthalene - 3,6 - disulphonic acid,
1 - (α,β - dibromopropionylamino) - 8 hydroxynaphthalene - 4,6 - disulphonic acid,
1 - (α,β - dibromoproprionylamino) - 8 - hydroxynaphthalene - 3,6 - disulphonic acid and
1 - bromoacetylamino - 8 - hydroxynaphthalene - 4,6 - disulphonic acid.

EXAMPLE 4

5.18 parts of dyestuff of the formula

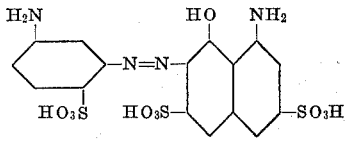

are neutralized in 300 parts of water with sodium carbonate. A solution of 6 parts of 3,5-dinitro-4-chlorobenzoyl chloride in 30 parts of acetone is added dropwise at room temperature to the solution of the dyestuff, the pH of the solution being kept at between 7 and 8 by the simultaneous dropwise addition of an aqueous sodium carbonate solution. After the two amino groups have been completely acylate, the dyestuff is completely precipitated by the addition of sodium chloride and then dried in vacuo at 50 to 60° C. The dyestuff dyes wool bluish red shades.

EXAMPLE 5

40.2 parts of 4-(α,β-dibromopropionylamino)-1-amino-benzene-2-sulphonic acid are dissolved in 600 parts of water in the presence of sodium carbonate; 30 parts of 30% hydrochloric acid are added at 0 to 5° C. and diazotization is effected with 25 parts by volume of 4 N sodium nitrite solution. The diazo suspension is then added to a solution of 65.2 parts of 1[3′-(α,β-dibromoproprionylamino)-benzoylamino]-8-hydroxynaphthalene - 4,6-disulphonic acid and 70 parts of sodium acetate crystals in 600 parts of water. After coupling, the pH of the dyestuff is adjusted to 12 with a 10 N sodium hydroxide solution, the temperature being kept at between 10 and 15° C. by the addition of ice. After 15 minutes, the batch is neutralized to pH 7.0 with hydrochloric acid, the dyestuff is completely precipitated by the addition of sodium chloride, isolated by filtration and then dried at 70 to 80° C. in vacuo. The dyestuff so obtained which, in the form of the free acid, corresponds to the formula

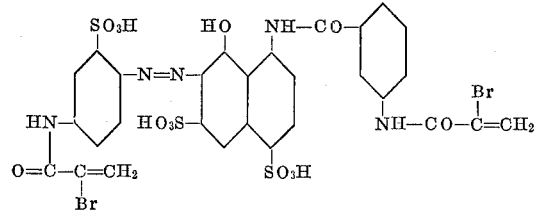

dyes wool fast, bluish red shades.

EXAMPLE 6

32.1 parts of 4-(α-bromacrylamino)-1-aminobenzene-2-sulphonic acid are dissolved in 600 parts of water in the presence of sodium carbonate; 30 parts of 30% hydrochloric acid are added at 0 to 5° C. and diazotization is effected with 25 parts by volume of 4 N sodium nitrate solution. The diazo suspension is then added to a solution of 57.1 parts of 1-[3′(α-bromacylamino)-benzoylamino]-8-hydroxynaphthalene-4,6-disulphonic acid and 70 parts of sodium acetate crystals in 600 parts of water. After coupling, the dyestuff is completely precipitated by the addition of sodium chloride, isolated by filtration and then dried in vacuo at 60 to 70° C. The dyestuff so obtained is identical with the dyestuff described in Example 1.

Dyestuffs which dye wool the shades indicated in Column III of the following table may be obtained from the diazo components listed in Column I by coupling with the coupling components listed in Column II in accordance with the process described in Example 1.

The α,β-dibromopropionyl derivatives shown in Columns I and II may be replaced by the corresponding α-bromacrylic derivatives, in which case the procedure described in Example 2 should be followed.

and alkenyl chain, and phenylcarboxamidophenyl; and X represents an α-bromoacrylic grouping, an α,β-dibromopropionyl grouping, a mono- or di-nitrochlorobenzoyl grouping.

| I | II | III |
|---|---|---|
| 4-(α,β-dibromopropionylamino)-1-aminobenzene-2-sulphonic acid | 1-[4'-(α,β-dibromopropionylamino)-benzoylamino]-8-hydroxynaphthalene-3,6-disulphonic acid. | Red-violet. |
| Do | 1-[4'-(α,β-dibromopropionylamino)-benzoylamino]-8-hydroxynaphthalene-4,6-disulphonic acid. | Bluish red. |
| 5-(α,β-dibromopropionylamino)-1-aminobenzene-2-sulphonic acid | 1-[4'-(α,β-dibromopropionylamino)-benzoylamino]-8-hydroxynaphthalene-3,6-disulphonic acid. | Red. |
| Do | 1-[4'-(α,β-dibromopropionylamino)-benzoylamino]-8-hydroxynaphthalene-3,6-disulphonic acid. | Red. |
| Do | 1-[3'-(α,β-dibromopropionylamino)-benzoylamino]-8-hydroxynaphthalene-3,6-disulphonic acid. | Red. |
| Do | 1-[3'-(α,β-dibromopropionylamino)-benzoylamino]-8-hydroxynaphthalene-4,6-disulphonic acid. | Red. |

EXAMPLE 7

30 parts of 30% hydrochloric acid are added to 41.6 parts of 5-(3',5'-dinitro-4'-chlorobenzoylamino)-1-aminobenzene-2-sulphonic acid in 1,000 parts of water having a temperature of 0 to 5° C., and diazotization is effected with 25 parts by volume of 4 N sodium nitrite solution. The diazo suspension, which is acid to Congo paper, is added to a suspension of 57.1 parts of 1-[4'-(α-bromacrylamino) - benzoylamino] - 8 - hydroxynaphthalene - 3,6-disulphonic acid in 300 parts of water and 40 parts of sodium acetate. After coupling, the dyestuff is completely precipitated by the addition of sodium chloride, isolated by filtration and then dried in vacuo at 60 to 70° C. The dyestuff so obtained dyes wool fast red shades.

Similar dyestuffs which also dye wool fast red shades may be obtained by replacing the 1-[4'-(α-bromacrylamino) - benzoylamino] - 8 - hydroxynaphthalene - 3,6-disulphonic acid with an equivalent proportion of one of the following coupling components.

1-[4'-(α-bromacrylamino)-benzoylamino]-8-hydroxynaphthalene-4,6-disulphonic acid,
1-[3'-(α-bromacrylamino)-benzoylamino]8-hydroxynaphthalene-4,6-disulphonic acid,
1-[3'-(α-bromacrylamino)-benzoylamino]-8-hydroxynaphthalene-3,6-disulphonic acid and
1 - [4'-(3'',5''-dinitro-4''-chlorobenzoylamino) - benzoylamino]-8-hydroxynaphthalene-3,6- disulphonic acid.

Dyeing procedure 2 parts of the dyestuff obtained in the manner described in Example 1 are dissolved in 4,000 parts of water; 10 parts of sodium sulphate crystals are added and then 100 parts of well-wetted wool are entered into the dyebath so prepared at 40 to 50° C. 2 parts of 40% acetic acid are then added, the dyebath is brought to the boil within half an hour, and dyeing is carried out at the boil for 45 minutes. The wool is then rinsed in cold water and dried. It is dyed a red shade which is fast to washing and which possesses a good fastness to light.

I claim:
1. Monoazo dyestuff which, in the form of the free acid, corresponds to the formula

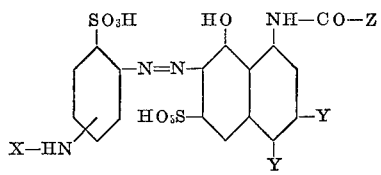

in which one of the symbols Y represents a hydrogen atom and the other symbol Y represents a sulphonic acid group, Z represents alkyl or alkenyl containing up to 4 carbon atoms, phenyl, alkylcarboxamidophenyl, alkenylcarboxamidophenyl containing up to 4 carbon atoms in said alkyl 2. A dyestuff as claimed in claim 1, which corresponds to the formula

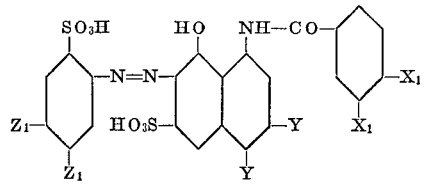

wherein one of the symbols $X_1$, one of the Y's and one of the $Z_1$'s represents a hydrogen atom, the other $X_1$ being an α,β-dichloro- or dibromopropionylamino or an α-bromoacrylamino group, the other Y being a sulfonic acid group and the other $Z_1$ an α,β-dibromopropionylamino or for an α-bromoacrylamino group.

3. A dyestuff as claimed in claim 1, which corresponds to the formula

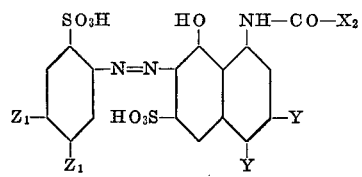

where $X_2$ represents a lower alkyl or a lower alkoxy group, a phenyl or a

group, one Y is hydrogen, the other Y is a sulfonic acid group, one $Z_1$ is hydrogen and the other $Z_1$ is α-bromoacrylamino.

4. The dyestuff according to claim 1, which corresponds to the formula

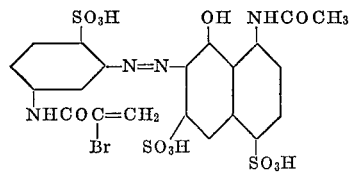

5. The dyestuff according to claim 1, which corresponds to the formula

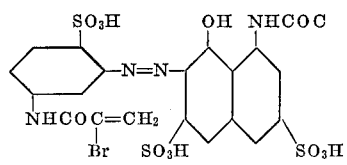

6. The dyestuff according to claim 1, which corresponds to the formula

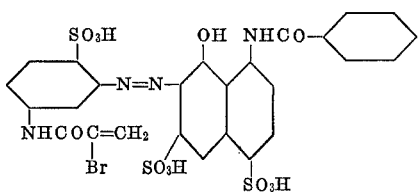

7. The dyestuff according to claim 1, which corresponds to the formula

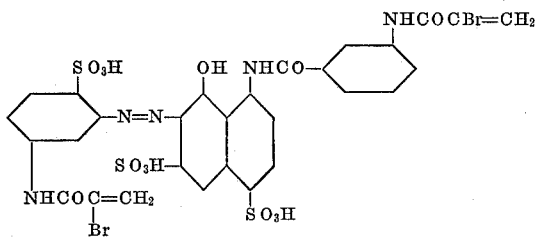

8. The dyestuff according to claim 1, which corresponds to the formula

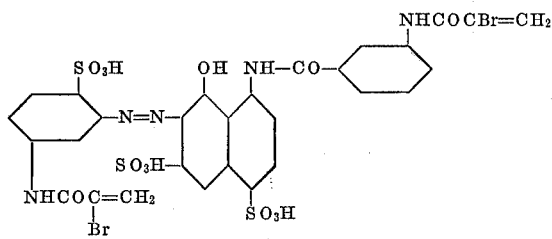

9. The dyestuff according to claim 1, which corresponds to the formula

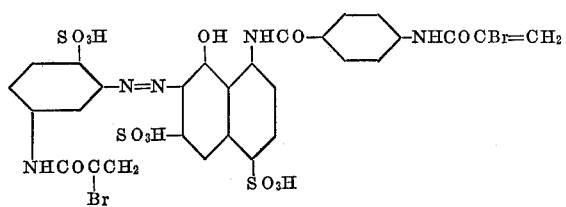

10. The dyestuff according to claim 1, which corresponds to the formula

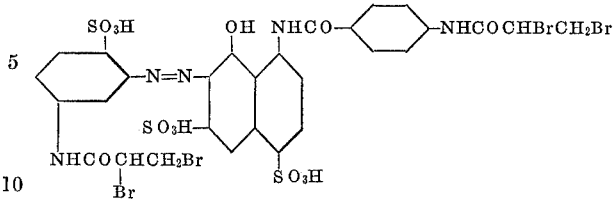

11. The dyestuff according to claim 1, which corresponds to the formula

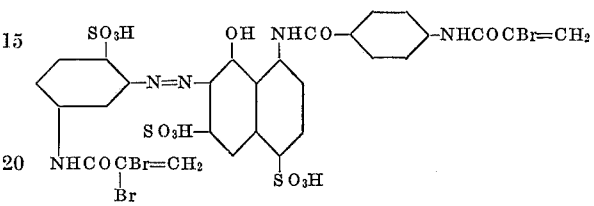

12. The dyestuffs according to claim 1, which correspond to the formula

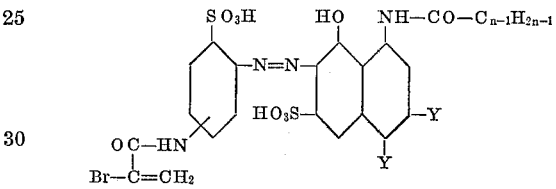

in which $n$ is a positive integer not greater than 5, one of the symbols Y represents a hydrogen atom and the other symbol Y represents a sulfphonic acid group.

References Cited
FOREIGN PATENTS

| | | | |
|---|---|---|---|
| 1,343,211 | 10/1963 | France | 260—199 |
| 412,151 | 11/1966 | Switzerland | 260—199 |

CHARLES B. PARKER, Primary Examiner

C. F. WARREN, Assistant Examiner

U.S. Cl. X.R.

8—41, 50, 51